United States Patent [19]
DeBaun

[11] 3,748,901
[45] July 31, 1973

[54] AIR FLOW BALANCING DEVICE
[75] Inventor: Kenneth W. DeBaun, Novato, Calif.
[73] Assignee: Air Monitor Corporation, Santa Rosa, Calif.
[22] Filed: Mar. 31, 1971
[21] Appl. No.: 129,769

[52] U.S. Cl. ................................................. 73/212
[51] Int. Cl. ............................................. G01p 5/16
[58] Field of Search ...................................... 73/212

[56] References Cited
UNITED STATES PATENTS
3,355,946   12/1967   Lazell .................................. 73/212
FOREIGN PATENTS OR APPLICATIONS
724,276    2/1955   Great Britain ........................ 73/212

Primary Examiner—Richard C. Queisser
Assistant Examiner—Arthur E. Korkosz
Attorney—Eckhoff, Hoppe, Slick, Mitchell & Anderson

[57] ABSTRACT

An improved air balancing hood collects air discharged to atmosphere from air diffusers, grilles, etc., such as those used in typical heating, ventilation and air-conditioning systems, in a convergent collection chamber which terminates in an air-straightening neck of known cross-section to eliminate turbulence and thereby achieve substantially laminar air flow for delivery to flow measuring instrumentation. The volume of air passing through the diffuser is directly measured by total pressure measuring means assembled to the hood and calibrated in flow rate units.

4 Claims, 4 Drawing Figures

PATENTED JUL 31 1973 3,748,901
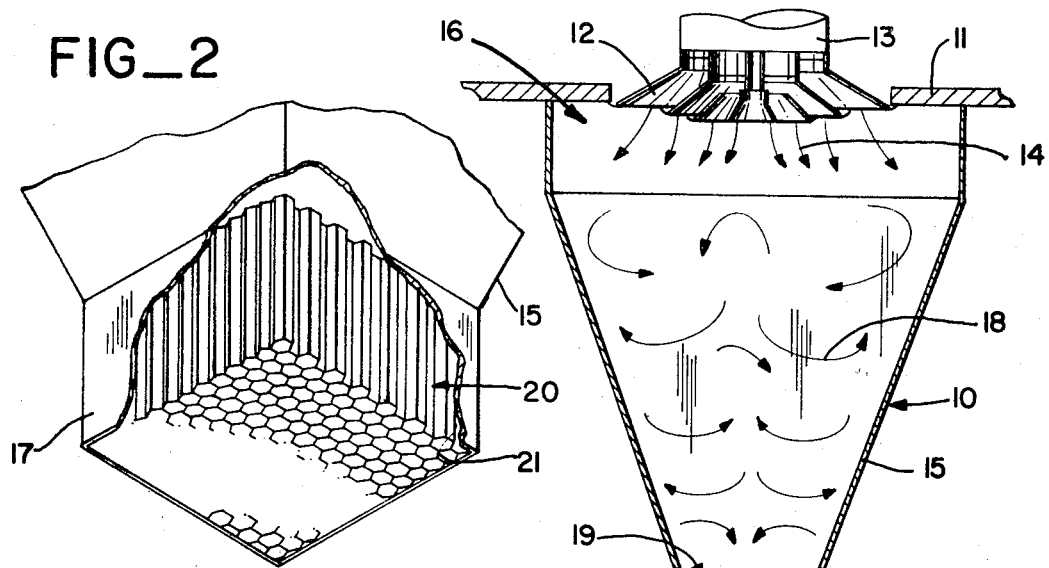
FIG_2
FIG_1
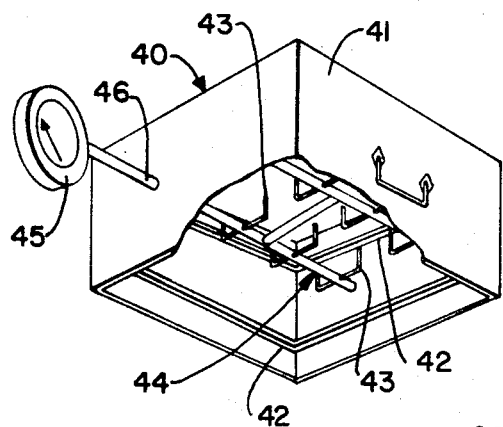
FIG_4
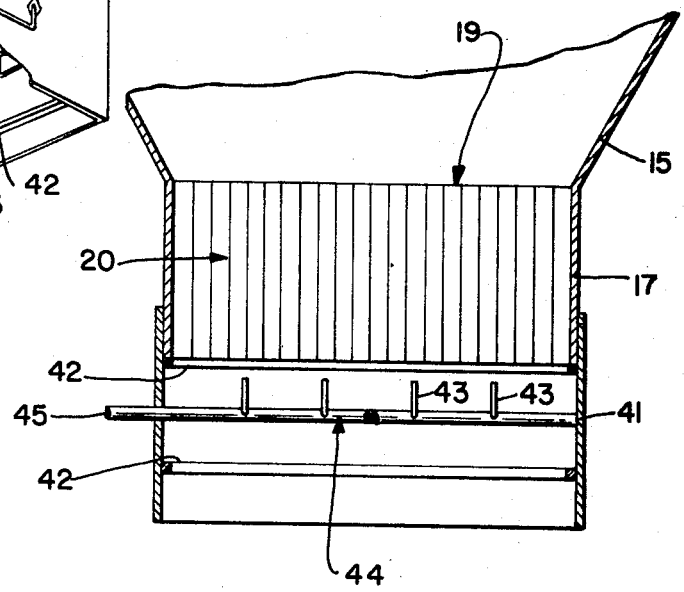
FIG_3
INVENTOR.
Kenneth W. DeBaun
BY Eckhoff Hoppe
Slick, Mitchell and Anderson
ATTORNEYS

AIR FLOW BALANCING DEVICE

This invention relates generally to devices for measuring the volume of air flow discharged from air diffusers, grilles and the like and more particularly relates to balancing hoods used to balance air flow from a system having two or more air diffusers, grilles, etc. that discharge to atmosphere.

Critical factors in the design and operation of forced air heating, ventilation and air-conditioning systems are the measurement of air discharge from each air diffuser in the system and the balancing of relative discharge of two or more diffusers. Both heretofore have been done with simple convergent balancing hoods which collect the diffuser air discharge and direct it to flow-measuring instrumentation. Measurement of the air flowing from the hood has not been accurate because of the usual severe turbulence within and exiting from the hood. Previous efforts to alleviate such turbulence have increased the pressure drop across the hood thereby reducing the accuracy of the flow measurements.

One object of this invention is to provide an improved air balancing hood which produces laminar flow discharge directed toward the air flow measuring instrumentation.

Another object of the present invention is to provide an improved air balancing hood that converts turbulent diffuser discharges to laminar flow with negligible pressure loss.

A further object of this invention is to provide an air balancing hood assembly which gives direct cubic feet per minute flow readings without the need for mathematical calculation.

Other objects and advantages of the invention will become apparent from consideration of a preferred embodiment of the balancing hood and assembly described herein and shown in the accompanying drawings wherein:

FIG. 1 is an elevational sectional view of a balancing hood constructed in accordance with the teachings of the invention and placed in position to collect the output of a ceiling diffuser;

FIG. 2 is a partial perspective view of the hood shown in FIG. 1;

FIG. 3 is an enlarged sectional view of a portion of the hood of FIG. 1 assembled with the total pressure measuring means shown in FIG. 4; and FIG. 4 is a perspective view, partly in section, of a total pressure measuring means assembled in combination with the improved balancing hood of FIG. 1.

FIG. 1 illustrates the improved balancing hood 10 positioned against ceiling 11 and collecting air discharged by diffuser 12 from air duct 13. The balancing hood 10 collects all the air discharged by the diffuser as at 14.

The hood 10 includes an open-ended convergent collection chamber 15 that directs air collected by the mouth 16 at its large end from the diffuser 12 downward through a smaller throat 19 at its small end to neck 17 with which the throat communicates. Typical turbulent air currents within chamber 15 are shown as arrows 18. The neck 17 of the described embodiment is square and is of known cross-section. The hood is made from light weight and durable material such as aluminum or corrugated paper stock. The described convergent collection chamber 15 is generally shaped but shapedbut may have other convergent shapes such as that of a truncated cone. Its walls must form a continuous surface and its mouth must define an opening large enough to collect all the air discharged through diffuser 12. It is also important that throat 19 and neck 17 define an opening which is of known cross-section and through which collected air passes at velocities within the range of 300 to 600 feet per minute.

An air-flow straightening means 20 mounts within the neck 17. Such means comprises about a three-inch long section of rigid honeycomb which is a plurality of hexagonally shaped passages 21 extending in the direction of the desired air flow. The air which emerges from air-flow straightening means 20 exhibits substantially laminar flow characteristics as shown by the arrows 22 and includes all of the air collected by convergent collection chamber 15.

The cross-sectional area of air-flow straightening means 20 is the same as that of neck 17 with approximately 96 percent free area. The area of the throat 19 of the convergent collection chamber 15 ranges from half to one-fourth that of its mouth 16.

The total pressure measuring means of FIG. 4 can be assembled with the improved balancing hood 10 as is shown in FIG. 2 to produce an average total pressure traverse across the neck which is directly calibrated into cubic feet per minute, for example. In the described embodiment the total pressure measuring means referred to generally as 40 comprises an open-ended square frame 41 which with a slight pressure fit embraces the balancing hood neck 17 and seats against one or the other of beads 42 formed on the inner periphery of the frame 41.

A plurality of pitot tube tips 43 opening toward the air flow mount from a manifold assembly referred to generally as 44 across the full section of the frame 41. They are distributed in the manner described in the co-pending application Ser. No. 27,758, now U.S. Pat. No. 3,685,355, filed Apr. 13, 1970 by this applicant and entitled Air Monitoring System. The pitot tube tips 43 sense and by means of the interconnecting manifold 44 average the total pressure across the known cross-sectional area of the neck. Indicating means 45 sensing the average total pressure at connection 46 can be directly calibrated into cubic feet per minute of air flowing through the ceiling diffuser 12 since the diffuser and the assembly both discharge to atmosphere and the pressure drop across the balancing hood assembly is negligible.

I claim:

1. An improved air-flow balancing assembly for directly making measurements of the rate of flow of non-laminar exhausts of air from diffuser ports, such as room heating or cooling vents or the like, wherein the normal path of flow of air into the room from the diffuser is an uncontained, non-directional flow, comprising a lightweight, portable convergent air collection chamber having a continuous surface defining first and second openings, said first opening constituting a mouth of such dimensions as to encompass in overlapping relationship each such air diffuser against which said portable collection chamber is held to collect all the air discharged therefrom during the period in which the flow from each such diffuser is measured, said second opening defining a throat of a smaller known area, a neck of lightweight material connected to said convergent air collection chamber at such throat, said neck having a cross-sectional area equal to that of such throat, air-flow straightening means of lightweight material and of substantially open form for minimizing the resistance to air flow therethrough, said air-flow straightening means having a cross-sectional area equal to that of said neck and being positioned within said neck for achieving generally laminar flow of the air passing therethrough, and means located downstream from said air-flow straightening means for making an average total pressure traverse across the entirety of said known cross-sectional area of said neck.

2. The assembly of claim 1 wherein the last-mentioned means includes a plurality of pitot tube tips distributed across said neck area and manifolded together.

3. The assembly of claim 2 wherein the average velocity of air passing through said neck is within the range of 300 to 600 feet per minute.

4. The assembly of claim 2 further including indicating means communicating with the manifold pitot tube tips which is calibrated directly in units of air flow rate.

* * * * *